US008524080B1

(12) United States Patent
Schuh

(10) Patent No.: US 8,524,080 B1
(45) Date of Patent: Sep. 3, 2013

(54) PURIFICATION APPARATUS FOR CONTAMINATED WATER EMPLOYING HIGH-VOLTAGE DC PULSE AND SUBSEQUENT LOW-VOLTAGE DC FIELD

(71) Applicant: Allen John Schuh, Pleasanton, CA (US)

(72) Inventor: Allen John Schuh, Pleasanton, CA (US)

( * ) Notice: Subject to any disclaimer, the term of this patent is extended or adjusted under 35 U.S.C. 154(b) by 0 days.

(21) Appl. No.: 13/709,016

(22) Filed: Dec. 9, 2012

Related U.S. Application Data

(62) Division of application No. 13/229,993, filed on Sep. 12, 2011, now Pat. No. 8,354,030.

(51) Int. Cl.
*C02F 1/46* (2006.01)
*H05F 3/00* (2006.01)

(52) U.S. Cl.
USPC ...... 210/243; 210/748.01; 210/295; 210/322; 210/232; 210/348; 204/157.15; 204/554; 204/571; 204/164; 204/157.2

(58) Field of Classification Search
USPC ............... 210/748.01, 243, 295, 322, 323.1, 210/348; 204/155, 156, 157.15, 157.2, 164–177, 450, 204/518, 520, 550, 551, 553, 554, 542, 543, 204/544, 560, 571, 193, 194, 416, 232, 240, 204/242, 276, 280
See application file for complete search history.

(56) References Cited

U.S. PATENT DOCUMENTS

| | | | |
|---|---|---|---|
| 4,277,344 A | | 7/1981 | Cadotte |
| 5,007,994 A * | | 4/1991 | Snee .......................... 204/240 |
| 6,627,073 B2 * | | 9/2003 | Hirota et al. ............. 210/167.11 |
| 6,814,858 B2 * | | 11/2004 | Yamamoto et al. ........ 210/167.3 |
| 7,338,600 B2 | | 3/2008 | Chidambaran et al. |
| 7,501,046 B1 | | 3/2009 | Constantz |
| 7,520,971 B2 | | 4/2009 | Iwasaki |
| 7,591,088 B1 | | 9/2009 | Schuh et al. |
| 7,897,019 B2 | | 3/2011 | Akers |
| 2001/0013467 A1 * | | 8/2001 | de Jong et al. ................ 204/164 |
| 2004/0084381 A1 * | | 5/2004 | Korenev ....................... 210/748 |
| 2008/0035548 A1 * | | 2/2008 | Fan .............................. 210/243 |
| 2008/0296171 A1 * | | 12/2008 | Davidson ..................... 205/639 |

OTHER PUBLICATIONS

U. S. Environmental Protection Agency, "Announcement of the Drinking Water Contaminant Candidate List", Federal Register, Mar. 2, 1998, pp. 10273-10287, vol. 63, Nr. 40.

* cited by examiner

*Primary Examiner* — Joseph Drodge
*Assistant Examiner* — Cameron J Allen
(74) *Attorney, Agent, or Firm* — David Pressman

(57) ABSTRACT

An apparatus for removing cyanotoxins and excess ions from contaminated water. Contaminated water passes from a storage tank (200), through a sand filter (210), through a reaction chamber (230), and finally through a carbon filter (270). The sand filter removes particulates and some bacteria. Treatment of the water in the reaction chamber first destroys cyanotoxins, algae, and bacteria through the use of high voltage shocks applied between two groups of electrodes (285, 285'), then the voltage on the electrodes is lowered and electrolysis is used to sequester free ions in the water in the region near the electrodes. Partially treated water is removed from the upper portion of the reaction chamber and passed through a carbon filter (270) to remove radiation, and to improve taste and smell. After passage through the carbon filter, the water is potable. The water remaining in the reaction chamber is discarded into a reservoir (265).

17 Claims, 2 Drawing Sheets

PURIFICATION APPARATUS FOR CONTAMINATED WATER EMPLOYING HIGH-VOLTAGE DC PULSE AND SUBSEQUENT LOW-VOLTAGE DC FIELD

CROSS REFERENCE TO RELATED APPLICATIONS

This application is a division of Ser. No. 13/229,993, filed 2011 Sep. 12, now U.S. Pat. No. 8,354,030, issued 2013 Jan. 15, and is related to the following applications:

Ser. No. 12/110,860, filed 2008 Apr. 28, now U.S. Pat. No. 7,591,088, issued 2009 Sep. 22;

Ser. No. 12/399,323, filed 2009 Mar. 6, now U.S. Pat. No. 8,017,366, issued 2011 Sep. 13;

Ser. No. 12/341,380, filed 2008 Dec. 22, now U.S. Pat. No. 8,043,496, issued 2011 Oct. 25, Ser. No. 12/555,696, filed 2009 Sep. 8; now U.S. Pat. No. 8,137,717, issued 2012 Mar. 20, and Ser. No. 12/713,734, filed 2010 Feb. 26. now U.S. Pat. No. 8,187,861, issued 2012 May 29.

BACKGROUND

1. Field

The field is water treatment, and in particular the neutralization of cyanotoxins in the water environment.

2. Prior Art

The following is a list of some prior art that presently appears relevant:

| Pat. or Pub. No. | Kind Code | Issue or Pub. Date | Patentee or Applicant |
|---|---|---|---|
| 4,277,344 | B1 | 1981-07-07 | Cadotte |
| 7,338,600 | B2 | 2008-03-04 | Chidambaran et al. |
| 7,501,046 | B1 | 2009-03-10 | Constantz |
| 7,520,971 | B2 | 2009-04-21 | Iwasaki |
| 7,591,088 | B1 | 2009-09-22 | Schuh et al. |
| 7,897,019 | B2 | 2011-03-01 | Akers |

NON-PATENT LITERATURE DOCUMENTS

Federal Register. 1998 Mar. 2. Vol. 63, No. 40, "Announcement of the Drinking Water Contaminant Candidate List", pp. 10273-10287.

Basic information about radionuclides in drinking water can be found at: http://water.epa.gov/drink/contaminants/basicinformation/radionuclides.cfm Discussion There is increasing focus on the use of algae biofuel as a replacement for petroleum-based hydrocarbons. In the harvesting operations, massive amounts of algae feedstock are smashed or ruptured to remove biomass for fuel processing. However this releases massive amounts into the water that is discharged from the operation. See my related U.S. Pat. Nos. 7,591,088, 8,017,366, 8,043,496, 8,137,717, and 8,187,861, for more information on this subject.

The study of toxic algae, known as cyanobacteria, is called phycotoxicology. Various classifications have been proposed, but none is entirely satisfactory. The cyanobacteria (Cyanophyta, blue-green algae) are named under the Botanical Code (International Code of Botanical Nomenclature, published by the International Association for Plant Taxonomy) and the Bacteriological Code (International Code of Nomenclature of Bacteria, published by the International Union of Microbiological Societies), leading to some taxonomic confusion. Cyanobacteria are commonly referred to as blue-green algae. Traditionally they were thought of as a form of algae and were introduced as such in older textbooks. They are now considered to be more closely related to bacteria so the term for true algae is restricted to eukaryotic organisms, i.e., those comprising one or more cells that contain nuclei and organelles. Like true algae, cyanobacteria are photosynthetic and contain photosynthetic pigments, which is why they are usually green or blue. Cyanobacteria are known for their diversity in terms of morphological, physiological, and toxicological properties. As a whole, the toxins are colorless, tasteless, and odorless. In the following, I shall refer to them as cyanobacteria.

It has long been known that water borne toxins from cyanobacteria threaten the health of humans and livestock. Cyanobacterial toxins can be classified according to their chemical structures as cyclic peptides (e.g., microcystin and nodularin), alkaloids (e.g., anatoxin-a, anatoxin-a(s), aplysiatoxins, cylindrospermopsin, lyngbyatoxin-a, saxitoxin), and lipopolysaccharides (LPS). Evidence for adverse human health effects from cyanotoxins derives from three principal sources: epidemiological evidence, including human poisonings, animal poisonings, and toxicological studies. Some neurotoxins have been implicated as a significant environmental risk in the development of neurodegenerative diseases such as Alzheimer's disease, Parkinson's disease, and Amyotrophic Lateral Sclerosis (ALS).

The magnitude of the cyanobacteria toxin threat has only been appreciated with technological advances in detection, such as by high-pressure liquid chromatography (HPLC). Better analytical methods, in addition to HPLC, include enzyme-linked immunosorbent assays (ELISA) and the protein phosphatase assays for microcystins and nodularins. The development of these methods has made the quantification of total and individual toxins possible. Most fresh water and marine samples tested show at least one toxin is present.

Experts have recognized that the toxins are not removed by conventional water treatment procedures, such as boiling or chlorination. It is for that reason that in 1998 the US Environmental Protection Agency (USEPA) included freshwater cyanobacteria and their toxins on the first Candidate Contaminant List (CCL) (Federal Register, 1998).

Because molecules are smaller than light waves, they cannot be observed directly, so models of their structure must be visualized by alternative means. Thus all references to molecular structure are hypothetical constructs incapable of direct observation. However, the hypothetical constructs are important to allow us to plan water purification strategies.

A molecule is an aggregation of atomic nuclei and electrons that is sufficiently stable to possess observable properties. Water is a compound of hydrogen and oxygen. Each hydrogen nucleus is bound to a central oxygen atom by a pair of electrons that are shared between them, called a covalent chemical bond. In $H_2O$, only two of the six outer-shell electrons of oxygen are used for this purpose, leaving four electrons that are organized into two non-bonding pairs. The $H_2O$ molecule is electrically neutral, but the positive and negative charges are not distributed uniformly. The electronic (negative) charge is concentrated at the oxygen end of the molecule, owing partly to the nonbonding electrons, and to oxygen's high nuclear charge, which exerts stronger attractions on the electrons. This charge displacement constitutes an electric dipole.

Opposite charges attract, so the partially-positive hydrogen atom on one water molecule is electrostatically attracted to the partially-negative oxygen on a neighboring molecule. This process is called hydrogen bonding. A hydrogen-bonded cluster in which four H$_2$Os are located at the corners of an imaginary tetrahedron is an especially favorable (low-potential energy) configuration. The molecules undergo rapid thermal motions on a time scale of picoseconds. Thermal motions cause individual hydrogen bonds to break and re-form in new configurations, inducing ever-changing local discontinuities whose extent and influence depends on the local temperature and pressure. Little is known about the extent to which an arrangement propagates to distant molecules.

Water molecules interact strongly with ions, which are electrically-charged atoms or molecules. Water can hydrogen-bond to itself and to any other molecules that have —OH or —NH2 units hanging from them. This includes simple molecules such as alcohols and macromolecules such as proteins. The biological activity of proteins, of which enzymes are an important subset, is dependent not only upon their composition but also on the way these molecules are folded. Folding involves hydrogen-bonded interactions with water and between different parts of the molecule itself. Anything that disrupts these intramolecular hydrogen bonds will denature the protein and destroy its biological activity.

Water Quality

Water quality problems and recommended treatment systems have been extensively studied so that there is an extensive prior art on this subject.

Cadotte, supra, shows a reverse osmosis (RO) unit that can remove a variety of inorganic chemicals, such as nitrates, calcium, and magnesium, but does not remove cyanotoxins or microbiologicals, such as viruses. Also RO does not remove radionuclides that produce radiation (hereinafter radiation).

Constantz and Akers, supra, employ evaporation and distillation in an attempt to remove toxic metals (lead, mercury, arsenic, cadmium), and other minerals (nitrate, sulfate, sodium) from seawater as an alternative to RO. The toxins that are heat stable can recombine with the water droplets during condensation. It is not known whether distillation removes radiation.

Chidambaran and Iwasaki employ electrodeionization (EDI), also referred to as Continuous Electro Deionization (CEDI) and Continuous Deionization (CDI). CDI utilizes ion exchange resins which are continuously regenerated by an electrical current. The major difficulty with this method, besides its cost and the fact that it is only being about 65% effective, is that a membrane is required and this has similar cost and maintenance problems as RO. The cost of operation puts it outside the affordability of most of the world's population. As indicated, it is only of limited effectiveness, and there is no evidence that it can neutralize cyanotoxins, nor can it remove radiation.

There is no proof that the three most advanced and expensive methods (RO, distillation, and EDI) neutralize and remove the cyanotoxins. This reaffirms USEPA's conclusion that cyanotoxins are not removed by conventional water treatment procedures.

In addition to being less effective, prior-art purification systems also required a relatively large amount of energy, used awkward mechanical filters as barriers, and were relatively slow and expensive. Even under the best conditions, prior systems were only about sixty-five percent effective in ion separation with the mechanical filters.

SUMMARY

A method and apparatus provide cyanodetoxification, removal of radiation, and removal of ions for conversion of marine and brackish water to create potable water for people and animals. Three mechanisms are used: high voltage to kill all biological material, electrolysis to separate water that is rich in ions from water that is relatively ion-free, and removal of radioactive material by filtration through carbon-containing filter systems. The result is a reliable, environmentally friendly, low-maintenance, cost-effective water treatment system that is suitable for use in remote locations.

DRAWINGS

Figure 1:
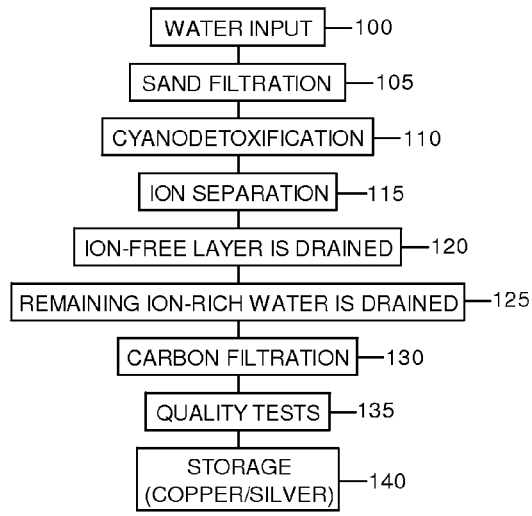
FIG. 1 is a flow diagram enumerating the steps in the procedure for treating cyanotoxin-contaminated water.

| REFERENCE NUMERALS | | | |
|---|---|---|---|
| 100-140 | Blocks | 200 | Tank |
| 205 | Support | 210 | Filter |
| 212 | Support | 215 | Pipe |
| 220 | Valve | 225 | Pump |
| 226 | Top | 230 | Tank |
| 232 | Support | 235 | Pipe |
| 240 | Valve | 245 | Pipe |
| 255 | Pipe | 260 | Valve |
| 265 | Reservoir | 270 | Valve |
| 285 | Electrode | 286 | Bus |
| 290 | Source | 291 | Conductor |
| 292 | Conductor | 295 | Controller |
| 296 | Conductor | 297 | Conductor |

General Operation of Apparatus

It has been established that cyanotoxins are a threat to public drinking water. It is also established that they are not removed by conventional treatment protocols.

The general mode of operation of this apparatus is to attack the electrical structure of the water molecules that envelop the toxins, as well as the toxins themselves. A large amount of energy and/or the use of mechanical filters as barriers are not necessary, thus reducing the cost, eliminating extra physical features and their related quality control, maintenance, and inventory of spare parts issues. This system is generally more effective, speedier, and less costly.

There are three physical features used in the present system.

The first is the use of very high voltage, delivered by electrodes in a processing tank, sufficient to kill all biological material of any size and nature, which also will deionize any cyanotoxins, rendering them neutral. The cyanotoxin proteins, enzymes, and trace elements are uncoupled by the high-voltage electricity. The process creates an avalanche of electrons. An electron avalanche is a process in which a number of free electrons in a medium are subjected to strong acceleration by an electric field. These electrons ionize the medium's atoms by collisions, called impact ionization, thereby releasing new electrons to undergo the same process in successive cycles. Protein denaturation is commonly defined as any non-covalent change in the structure of a protein. This change may alter the secondary, tertiary, or quaternary structure of the molecules. This may occur because the kinetic energy causes the molecules to vibrate so rapidly and violently that the bonds are disrupted. Denaturation disrupts the normal alpha-helix and beta sheets in a protein and uncoils it into a random shape. Electricity neutralizes the toxin by destroying the secondary and tertiary structures of enzymes by influencing their hydrogen bonds.

High-voltage electricity also reduces metal ions that are attached to enzymes, thus making these enzymes no longer destructive. The electric field changes the three-dimensional structure of the toxin, converting it to inert material. It also destroys all living water-borne carriers of illness such as various bacteria, viruses, and pathogenic microorganisms, including many that are intestinal parasites. These include protozoa, parasites, bacteria such as those that cause cholera and dysentery, and viruses such as those that cause hepatitis A and poliomyelitis. Water-borne illnesses have traditionally been a threat to the health of human populations.

The second feature is the use of electricity in an electrolysis operation to separate that portion of water relatively rich in ions from the water that is relatively ion-free. Thus, it is possible for virtually all water treatment facilities to use the new methodology to treat all water, even in marine or brackish areas. The present system can exceed the sixty-five percent effectiveness in ion separation. It requires no filter membrane inspection, maintenance, replacement, and turns over batches to be processed in larger volume in considerably less time, at orders of magnitude less electrical power consumption.

The third feature removes radiation from drinking water using a radiation-capturing carbon filter. Carbon has a long history of being used to absorb impurities. Radon 222 is a naturally occurring radioactive element that releases energy in picocuries per liter (pCi/L). Radon radiation is found virtually everywhere to be a contamination in drinking water sources. Carbon filter systems have been effective at lowering water-borne radon levels, but the radioactivity that builds up in the filter bed is of concern. Radon and its radioactive decay products emit alpha, beta, and gamma radiation. These and x-rays are types of ionizing radiation, i.e., radiation that can disrupt chemical bonds. Ionizing radiation is invisible and is not directly detectable by human senses, so instruments such as Geiger counters are usually required to detect its presence. In the apparatus described below, a Geiger counter monitors the radiation level in the filter to signal when it is time to change out the radiation capturing carbon filter.

Sometimes copper and/or silver are added to the carbon or are used separately in water storage containers. When used together, copper and silver ionization is suitable for producing safe drinking water. Electrically charged copper ions (Cu2+) in the water are attracted to particles of opposite polarity, such as bacteria, viruses, and fungi. Positively charged copper ions form electrostatic compounds with negatively charged cell walls of the microorganisms. These compounds disturb cell wall permeability and cause nutrient uptake to fail. Copper ions penetrate the cell wall and create an entrance for silver ions (Ag+). The silver ions penetrate the core of the microorganism. Silver ions bond to various parts of the cell, such as the DNA and RNA, cellular proteins, and respiratory enzymes, causing life support systems in the cell to be immobilized. There is no more cellular growth or cell division, preventing bacteria from multiplying. Copper-silver ionization has a larger residual effect than most other disinfectants including ultraviolet light (UV). Copper-silver is effective throughout the entire water system and does not depend on water temperature. Copper-silver is non-corrosive and does not affect pumps, shower heads, tanks, and taps.

DETAILED DESCRIPTION

First Embodiment

Process Steps—FIG. 1

FIG. 1 is a flow chart showing the steps outlined above for purifying water. Water is first collected (block 100) from a source that is possibly contaminated with cyanotoxins or excess ions, or both.

The water is first passed through a well-known sand filter (block 105) to remove particulate matter. Then cyanotoxins are removed (block 110). Next the positive and negative dissolved ions are separated (block 115), leaving an ion-free layer between and above the two; this ion-free layer above is drained (block 120) into a carbon filtration tank. The remaining ion-rich water is drained (block 125) from the system and discarded. The ion-free layer is passed through a carbon filter (block 130), and its quality is evaluated (block 135). Finally the purified water is stored (block 140), optionally in the presence of copper or silver or both. Each of these steps is described in detail below in connection with FIG. 2.

Figure 2:
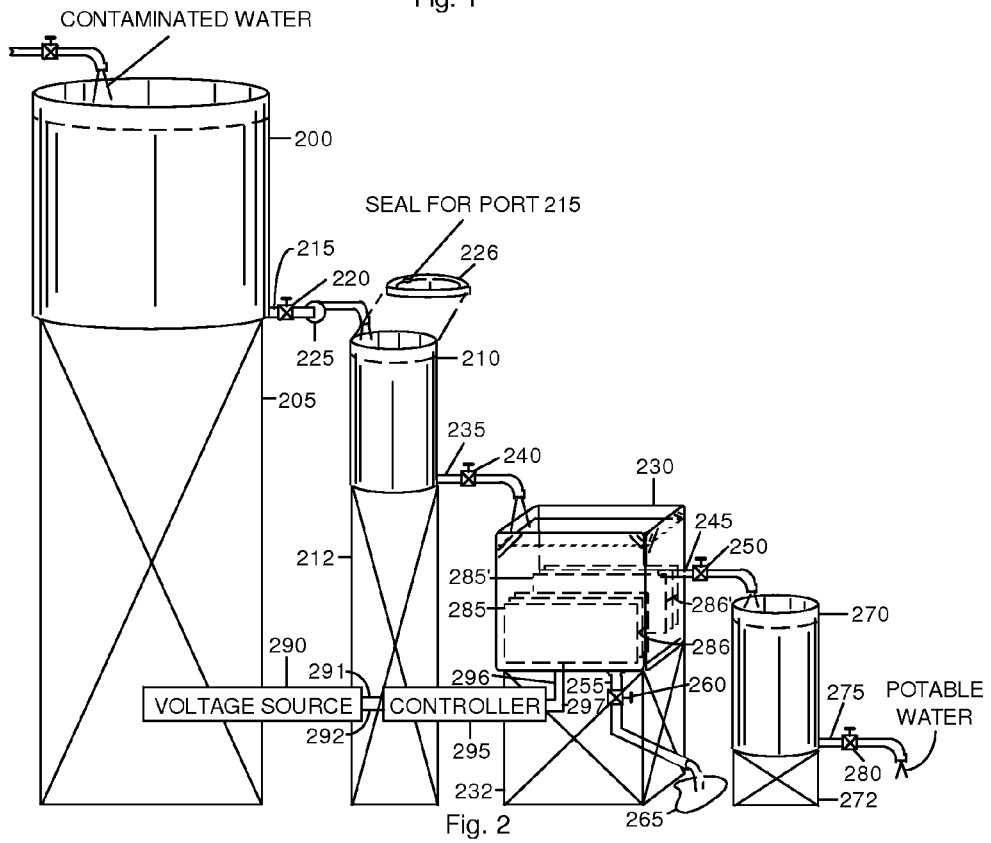
FIG. 2 shows one aspect of apparatus that is suitable for realizing the steps of FIG. 1.
Figure 3:
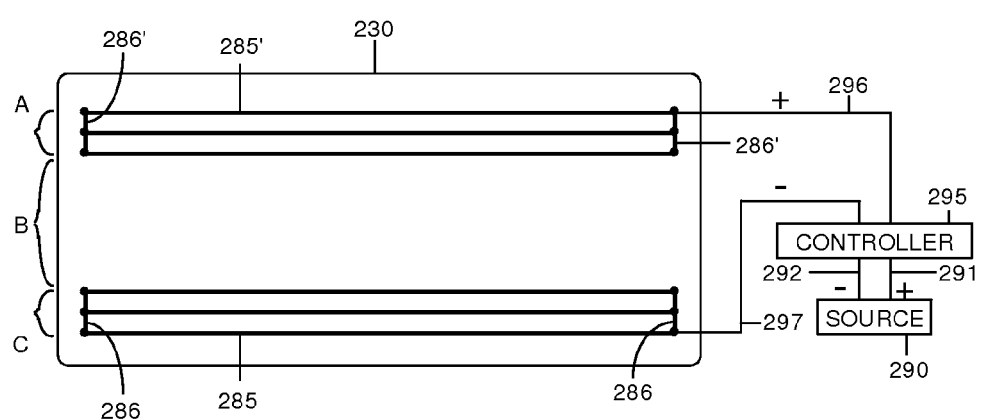
FIG. 3 is a top view of the reactants tank used in the embodiment of FIG. 2.

Apparatus—FIGS. 2 and 3

FIG. 2 shows one aspect of an embodiment for performing the purification steps discussed above. A staircase arrangement of components facilitates flow of water from one component to the next. A storage tank 200 for untreated water is filled from a source (not shown), such as a river, lake, pond, or any other source. For example, the source can be a system such as taught in the above U.S. Pat. Nos. 7,591,088, 8,017,366, 8,043,496, 8,137,717, 8,187,861, or the above pending application Ser. No. 13/229,993. These systems teach the cellular destruction of algae so that any cyanotoxins present within the algae are released into the water, which can be further treated by the present apparatus to destroy most or all of the cyanotoxins.

Tank 200 is elevated above the remaining components of the system on a support 205, such as a steel frame, or a raised section of earth. Water from tank 200 is dispensed into at least one well-known sand filter 210 via an outflow pipe 215 and valve 220. A support 212 holds filter 210 at a level generally below the bottom of tank 200 so that gravity can urge the water in tank 200 to flow via outflow pipe 215 into filter 210.

Instead of tank 200, outflow pipe and valve 220 can receive water directly from a contaminated source such as a reservoir, river, creek, stream, lake, well, or other body.

If tank 200 is not at the appropriate level for gravity flow of its contents, then a pump 225 can be added to move water from tank 200 to filter 210. Alternatively, a closed top 226 can be added to filter 210 and sealed to outflow port 215 so that pump 225 can be used to force water through filter 210 in order to maintain a desired flow rate of water through filter 210.

The purpose of sand filter 210 is to separate raw incoming water that has some dissolved compounds from the non-dissolved bits and pieces of debris that would otherwise make extra and potentially insuperable electrical, chemical, and mechanical demands on the more sophisticated procedures to follow. There is typically fine sand at the top and gravel or tiles at the bottom, with a graduation of sand particle sizes in between. A sand filter harbors many bacteria that break down other biological debris as the water passes through the filter. Such a filter can be rejuvenated by simply periodically replacing part or all of the sand.

A reactants tank 230 rests on a support 232 so that it lies generally beneath filter 210. When valve 240 is opened, water flows through outflow pipe 235 into tank 230. Tank 230 further includes an outflow pipe 245 and valve for removing water from the middle level of tank 230. An outflow pipe 255 and valve 260 are provided for releasing water from the bottom of tank 230 in order to discard the water into a reservoir 265 for waste water. Tank 230 contains a plurality of electrodes or plates in two groups 285 and 285'. All the electrodes in group 285 are connected together by a common bus 286 and all the electrodes in group 285' are connected together by a common bus 286'.

As shown in FIG. 3, electrode groups 285 and 285' are connected to a voltage source 290 via a controller 295. Source 290 delivers electrical potential energy to controller 295 via two conductors 291 and 292. When activated, controller 295 applies voltage to electrodes 285 and 285' via conductors 297 and 296, respectively, creating an electric field between electrodes 285 and 285'. The components within tank 230 are discussed in more detail below.

Next a simple, columnar charcoal filter tank 270 (FIG. 2) is provided and is supported by a support 272 so that the top of filter 270 lies below outflow pipe 245 of tank 230. As mentioned, pumps can be added to outflow pipes 235 and 245 instead of relying on gravity to move the water from one station to the next. Water passes through filter tank 270 in contact with well-known charcoal filter granules.

Tanks 200, 210, 230, and 270 can be made of any waterproof material, including steel, clay, wood, rubber, fiberglass, or plastic. Tank 200 can have a horizontal, elliptical shape with molded-in legs and made all of a plastic as one solid piece for simplicity and strength. Such a tank is the model no. 1400100N, manufactured by Snyder Industries, Inc., of Lincoln, Nebr., USA. This tank lies relatively horizontal, and is longer than wide or high for stability and strength, and for ease of access to the top for filling and removal of contents of the tank. The legs are molded in for stability and ease of tie-down to a flat bed truck or other means of transportation such as railcar or barge. Tank 200 typically holds 2,000 liters and remaining tanks 210, 230, and 270 are scaled as shown in FIG. 2. These sizes and their relationships are not limiting, however, and smaller or larger sizes can be used as required.

Reactants Tank—FIGS. 2 and 3

FIG. 3 is a top view of reactants tank 230. The components within tank 230 are arranged into three distinct regions: A, B, and C. Region A contains electrodes 285' that are commonly connected to controller 295 via positive lead 296. Region C contains electrodes 285 that are connected to controller 295 via negative lead 297. Region B is an open volume between the two sets of electrodes. Outflow pipes 245 and 255 have been omitted from FIG. 3 for clarity.

Tank 230 is made of an electrically non-conductive material such as wood, clay, plastic, fiberglass, rubber, or a composite material. Tank 230 has a depth of 1 m and must be able to hold water to a depth of about 80 percent full, about 800 liters.

Electrodes 285 and 285' are about 20 cm high and extend upward from the bottom of tank 230. They are approximately 90 cm long and each group is about 45 cm wide. Each group is shown as containing three electrodes or plates but other numbers can be used. The individual electrodes in groups 285 and 285' are about 2 mm thick and made of iron that does not contain chromium, zinc, or other materials that are toxic to algae and animals. The electrodes of each group are spaced about 1 cm apart, although other spacings can be used. The two central electrodes (the closest electrode of the group (285') and the closest electrode of the group (285)) are energized with opposite polarities and are spaced apart about 1 cm, although other spacings can be used.

Water enters tank 230 from the top. Outflow port 245 is located at 41 percent of the height of the water column in the tank, or about 41 cm from the bottom in the present example.

Voltage source 290 can be an automotive battery or a small generator. Controller 295 contains electrical circuitry for applying predetermined voltages to electrodes 285 and 285' via conductors 297 and 296, respectively. Controller 295 can be manually operated or can contain automatic circuitry, if desired. Controller 295 first applies a potential between leads 296 and 297 at a high voltage of at least 10 kVDC for at least 0.1 second, and then a lower voltage of at least 3 VDC for as long as it takes to separate the positive and negative ions and drain the tank of ion-free water, at least one minute and typically about 10 minutes. Source 290 and controller 29 are arranged so that the 20 KV potential can supply current of at least 1 ma and the 12 V source can supply a current of at least one ampere. With the two central electrodes spaced 1 cm apart, applying a potential of 20 KVDC yields an electric field strength between these electrodes of 20 KVDC/cm. Similarly, when 12 V is applied, the electric field strength between the same electrodes is 12 V/cm. These values can be varied, i.e., the high voltage potential can be varied between about 10 KV and 30 KV, and the low voltage potential can be varied between about 3 and 30 volts, but always should be sufficient and persistent enough to destroy cyanotoxins, bacteria, viruses, and parasites in the tank. The electric field values should be inversely proportionate to the quality of the water to be purified, with higher field values being used with lower quality water and vice versa.

Operation—FIGS. 2 and 3

After water input and sand filtration (FIG. 1, blocks 100 and 105) two processes are accomplished in tank 230. These are: cyanodetoxification and ionization separation (FIG. 1, blocks 110 and 115).

Cyanodetoxification is accomplished by the high, direct current potential that creates a high electric field between electrode groups 285 and 285'. Ion separation is accomplished by applying the lower potential between the electrode groups to create a low electric field. Other voltages can be used as conditions require.

Filling the Tank.

Prior to filling tank 230, the operator (not shown) checks to be sure valves 250 and 260 are closed and controller 295 is not applying any voltage to electrodes 285 and 285'.

The operator (or an automatic system) begins the decontamination procedure by opening valve 240 to begin filling of tank 230. Contaminated water is delivered in batches to tank 230 at a flow rate of at least 20 liters per minute or faster, filling tank 230 to 80 percent capacity. When the 80 percent level is reached, valve 240 is closed.

Sterilization and detoxification. The high-voltage is then applied by controller 295 for about two seconds to kill all biological organisms and neutralize all toxins. Then controller 295 apples the low voltage for as many minutes as it takes to de-ionize the water by electrolysis, typically at least 1 and up to about 10 minutes, and then maintain that voltage while that water drains in order to maintain separation of the positive and negative ions. In the absence of this voltage, turbulence caused by draining the water from the reactants tank would permit remixing of the already-separated positive and negative ions.

The operator begins the sterilization of the water and neutralization of the toxins by actuating controller 295, which delivers the high voltage to the electrodes in a burst, or shock, controlled by the operator. Experience has shown that shocks of about 2 seconds are sufficient. In addition, experience has shown that multiple short replications are better than one of equivalent long duration. These shocks can be applied manually by the operator or automatically by a timing device or computer. The voltage is adjusted by a technician who reads indicators (not shown) on controller 295 that indicates the power being delivered to electrodes 285 and 285'. The operator makes required changes and delivers the shocks as required. The character of the toxins contained in the water is immediately affected by high voltage (at least 10 kV, up to 30 kV). The high voltage neutralizes the toxins and sterilizes water-borne disease-carrying biological organisms. Direct current is applied via the submerged electrodes for 2 s. One shock may be sufficient, but more shocks may be given with 10 s between them. Even if the operator elected to deliver five shocks at 2 s duration, and 10 s between, the whole procedure would only take one minute. This process of shocking can be done manually or automatically. The shock and delay times can be adjusted from at least 0.1 s and at least 1 s, respectively, and the number of shocks being at least one can be any number that is required, all depending on the quality of the water. The high voltage used at this stage is dangerous and suitable safety measures must be observed.

The two central plates of opposite polarity will be the most effective, although weaker electric fields will exist between the remaining opposite-polarity plates, providing some additional benefits in terms of sterilization and deionization (discussed below). In the case of water from marine sources, there are usually so many ions and so much biological activity that having more surface available, i.e., additional plates, is desirable.

Deionization.

The technician (or an automatic system) switches controller 295 to deselect the high voltage and select the low voltage. Immediately, the second procedure begins, which is electrolysis to separate that portion of water that is relatively ion-rich from the water that is relatively ion-free. This is especially desirable when the originating water has more than one percent salt content. Electrolysis is a standard technique of chemistry laboratory activity. It uses the effect of a low-voltage direct current and a suitable electrolyte solution, in this case the high concentration of ions in contaminated water. The electrolytic method draws ions to the electrodes on either side of the tank and down to the level of the electrodes, depending upon their charge. The voltages and currents are low, so there is minimal electrical hazard. The direct current of low voltage (at least 3 V) draws ions to the electrodes, and thereby isolates the ions in the region of the electrodes in an avalanche. By default, the lighter specific gravity ion-free water is displaced to float to the top of the reactants container, thereby sequestering the ion-rich water in the region of the electrodes. There is nothing to draw the ion-free water back down to the region of the electrodes once its clusters are ion-free. The water maintains separation with ion-free above the ion-rich, provided the current remains on during the decanting of the top floating ion-free water. The overlapping structure of sheets of metal in the electrode design function as an ion-trap, thus no separate membranes or filters are needed. The electrode effectively holds the ions temporarily while under electrical charge.

The reaction occurs immediately upon actuation of controller 295. The clue that the ions have collapsed to the region of the electrodes is that bubbles begin to rise. Depending on the level of ions in the water, this may be immediately. Because the reactants tank is open at the top, gaseous oxygen and hydrogen are liberated so it is necessary that these gases be disposed of by venting into open air in order to prevent the possibility of an explosion.

When the current between electrode groups 285 and 285' reaches a maximum value, most of the free ions are at the level of the electrodes and it is time to remove the treated water from tank 230 and pass it on to carbon filter 270.

Removal of Water.

Water is removed from tank 230 in three stages. First valve 250 is opened, directing the treated water above electrodes 285 and 285' into filter 270. Next, the output of controller 295 is reduced to zero, deactivating the electrolysis process. Finally, valve 270 is opened, causing the ion-rich water to be released from tank 230. The ion-rich waste water is delivered to a reservoir 265 via outflow pipe 255. Reservoir 265 can be the original source of the water, another reservoir, or a waste stream (not shown). This water removal can be done manually or by automatic means.

In some cases, this ion-rich water can be further treated. Note that the ionized water was separated to either side of the reactants tank by a positive or a negative charge, i.e., to regions A and C (FIG. 3). It is possible to place additional exit ports on either side of the reactants tank devoted to maintaining the electrical separation of the water by ionization. In this case the electrical charge would be maintained during the emptying operation, confining the water on the positive electrode side to be dominated by negative ions, and confining the water on the negative electrode side to be dominated by positive ions. Multiple exhaust ports can be located on the respective sides that drain to ion storage, which may then be given additional processing treatment if desired.

In other cases, the water will not be treated further, so both ion-rich positive discharges and ion-rich negative discharges may be mingled and flushed back into the originating pond to serve as nourishment for the next generation of algae feedstock, for example. As there is little residue in the tanks after normal flushing, no cleanup as such is usually required. Immediately upon draining, the valves are closed and the unit is refilled to begin another sequence. The valves may be actuated manually or electronically in an automated system. The time required to perform the flushing operation depends upon the size and number of exhaust ports, but is usually less than ten minutes.

Carbon Filter Operation.

Carbon filtering is considered a common operation in prior-art water treatment, as much as sand filtering, by most water treatment specialists. The ion-free and toxin neutralized water at this stage of treatment will be passed through a carbon filter, both to improve the taste and odor, and also to remove radiation.

In the present apparatus, carbon filtration is accomplished by directing the water to flow through a conduit that is approximately 30 cm long and has a 10 cm inside diameter, such as a PVC pipe filled with at least a 25 cm of carbon held in place with cotton wadding on both the input and output ends. Any other shape or diameter of conduit or material of construction is acceptable as long as the flow rate is about 20 liters per minute (lpm) or greater. This rate is often possible or at least approachable with gravity flow alone and a new filter. The carbon filtration unit may be positioned vertically, diagonally, or horizontally. An optional pump (as indicated above) may be used to push the water through the carbon filtration procedure to maintain that rate of flow.

Many undesirable elements in the water, such as radiation can be collected by the carbon. In virtually all water samples, the radiation from radon is a serious and unacknowledged problem. A Geiger counter can be used to monitor the background radiation so that when that number reaches a predetermined criterion, e.g., double the base rate, the carbon filter can be switched out. The Gamma-Scout hand-held radiation detector or Geiger counter, sold by GS Geiger Group of Brentwood, Calif., is an example of a general purpose survey meter for measuring and detecting ionizing radiation. It can detect alpha, beta, gamma, and x-ray radiation and displays an exposure rate in both mrem/hr (milli-rem/hr) and tSv/hr (microSievert/hr). The tSv is an internationally accepted unit for tissue dosage. Other, similar detectors can be used.

Carbon filtered water that has been sterilized, detoxified, de-ionized, and has the radiation removed may be held in storage containers. It is ready for drinking, cooking, bathing, and laundry operations, and there is enough of it for all of those activities.

A water sample of the sterilized, detoxified, ion-free water may be taken at this point through outflow port 275. Specific gravity and pH may be measured. Other measures for water hardness may also be conducted. A specific gravity indication will show if the salt level is less than the one percent to qualify as fresh water rating. A pH test will allow the operator to make an adjustment to about a pH of 7 before the water is processed through the last filtration procedure. Acid up or down procedures are well known in the water treatment field. The ideal condition is a specific gravity of about 1 and a pH of about 7.

CONCLUSIONS, RAMIFICATIONS, AND SCOPE

Accordingly, the reader will see that, in one or more aspects, I have provided a method and apparatus for removing cyanotoxins from water. The apparatus is relatively small, low cost, simple, safe, and portable. The process is rapid and simple enough to be performed by a small crew of operators, even in remote settings. The process and apparatus maintain the ecosystem, improve the economics of producing alternative energy, and recover fresh water for multiple uses. I am not presently aware of any other water treatment procedure that can neutralize the cyanotoxins as this one does, or any other water treatment that can process marine or brackish water to potability in a similar volume at a lower cost while removing the cyanotoxic threat. The apparatus provides a systematic process for a low cost, simple, safe, and rapid neutralization of cyanotoxins, and separation of ion-reduced water from ion-enriched water, and decontamination of radon radiation, from any contaminated source of algae/cyanobacteria alternative fuel processing.

While the above description contains many specificities, these should not be construed as limitations on the scope, but as exemplifications of some aspects of the embodiment shown. All aspects of the embodiment are scalable to any size and to handle any volume of material. Many kinds of toxic contamination in water can be treated by this method. Instead of manual operation, the operation of the system can be automated. Instead of one originating tank, there can be many. The process can be conducted in parallel with a plurality of filters and reactant chambers. The voltages and times shown can be varied in accordance with the toxicity of the supply water. The key to positioning the electrodes is in the constraints: (1) the positive not touch the negative, and (2) they are confined to the bottom half of the water being processed. Positioning vertical, diagonal, horizontal or number does not matter.

The quality of incoming water determines how many high voltage pulses are required to kill algae and bacteria and destroy cyanotoxins. At least one high voltage pulse is required, but five could be better. It depends on how bad the incoming supply of water is. If it is water known from the number of prior steps in the processing stream to be quite free of problems, one pulse is enough. Direct from a farm pond, five pulses at two seconds duration, and ten seconds apart, would be required. During those two seconds of application, and ten seconds between pulses, the water churn, exposing different surfaces to the electrodes.

The sand filter is not required if the incoming water is low in organic material. However, water from a farm pond requires a sand filter. The carbon filter is not needed if the water is being used to irrigate plants and as drinking water for some farm animals. The carbon filter is necessary to remove any radiation that is present.

Thus, the scope should be determined by the appended claims and their legal equivalents, and not only by the examples given.

The invention claimed is:

1. An apparatus process for purifying water containing contaminants selected from the group consisting of cyanotoxins, bacteria, viruses, parasites, positively and negatively charged ions, and radiation, comprising:
    (a) a reactants tank arranged to receive and hold a quantity of said contaminated water, a bottom portion of said reactants tank containing a plurality of spaced-apart electrodes,
    (b) high-voltage means for pulsing two of said spaced-apart electrodes in said bottom portion of said reactants tank with a first direct-current electric field of at least 10,000 volts/cm for at least 0.1 second at least once while said quantity of contaminated water is in said tank to destroy said cyanotoxins, said bacteria, said viruses, and said parasites,
    (c) low-voltage means for applying tank a second direct-current electric field to two of said spaced-apart electrodes in said bottom portion of said reactants tank while said quantity of contaminated water is in said tank so that one of said two electrodes receiving said direct-current field is negatively polarized and the other of said two electrodes receiving said direct-current field is positively polarized, said electric field being at least 3 volts/cm and lasting for a duration of at least one minute so as to separate positively charged contaminant ions from negatively charged contaminant ions so that said positively charged ions are sequestered near said negatively charged electrode and said negatively charged ions are sequestered near said positively charged electrode, and
    (d) a carbon filter in an upper portion of said reactants tank for removing radiation from said water in order to provide potable water,
    whereby said cyanotoxins, said bacteria, said viruses, said parasites, said positively and negatively charged ions are reduced in said contaminated water so that said water is no longer contaminated and is potable.

2. The apparatus of claim 1, further including means for discarding a lower portion of said water in said reactants tank.

3. The apparatus of claim 1, further including means for passing said contaminated water through a sand filter prior to placing said water into said reactants tank.

4. The apparatus of claim 3, further including a sealed top on said sand filter and a pump to urge said contaminated water from said source of contaminated water through said sand filter in order to increase the rate of filtration by said sand filter.

5. The apparatus of claim 1 wherein said two electrodes which are pulsed with said high-voltage means are the same two electrodes to which said direct-current electric field is applied by said low-voltage means.

6. An apparatus for purifying contaminated water containing contaminants selected from the group consisting of cyanotoxins, bacteria, viruses, parasites, positively and negatively charged ions, comprising:
    a reactants tank arranged to receive said water, said reactants tank further including at least two electrodes located in a lower portion thereof, a first valve and a first outflow port located near mid-height of said reactants tank, and a second valve and a second outflow port located at a bottom of said reactants tank, an electrical source, a controller connected to said electrical source and said electrodes, said controller arranged to produce a short-duration, relatively high direct-current voltage shock pulse between said electrodes while said quantity of water is in said tank, said shock pulse being high enough to substantially destroy said cyanotoxins, said bacteria, said viruses, and said parasites, said controller also arranged to produce a long-duration, relatively low direct-current voltage between said electrodes while said quantity of water is in said tank so that one of said two electrodes receiving said direct-current voltage is negatively polarized and the other of said two electrodes receiving said direct-current voltage is positively polarized, said low-voltage being sufficient to substantially sequester positively charged ions near said negatively charged electrode and negatively charged ions near said positively charged electrode, said first valve arranged to drain said water from the upper portion of said reactants tank via said first outlet port to obtain potable water, said second valve in said second output port arranged to discard said water containing said sequestered positively charged ions and said sequestered negatively charged ions, and a sand filter preceding said reactants tank for filtering said contaminated water before said contaminated water fills said reactants tank, whereby said reactants tank can be filled with said contaminated water and said cyanotoxins, said bacteria, said viruses, and said parasites will be destroyed and said ions will be separated, thereby providing potable water for drinking at said first outlet port and ion-rich water for disposal at said second outlet port.

7. The apparatus of claim 6 wherein said short-duration, high-voltage shock pulse comprises an application of 20,000 volts/cm for one second.

8. The apparatus of claim 6 wherein said long-duration, relatively low direct voltage comprises an application of at least 12 volts/cm for at least 10 minutes.

9. The apparatus of claim 6, further including:
a top for said sand filter for sealing said filter,
an inlet port in said top,
a pump on said inlet port, the inlet of said pump connected to a source of contaminated water, and
means for energizing said pump in order to urge said contaminated water from said source and through said sand filter thereby increasing the rate of filtration by said sand filter.

10. The apparatus of claim 6, further including a carbon filter arranged to receive said potable water from said first outflow port, said carbon filter being arranged to remove any radiation from said potable water discharged through said first outflow port.

11. An apparatus for purifying water containing contaminants selected from the group consisting of cyanotoxins, bacteria, viruses, parasites, positively and negatively charged ions, comprising:
a storage tank for storing contaminated water, said storage tank having an outflow port with a valve for holding or releasing said contaminated water,
a reactants chamber arranged to receive said water from said first outflow port of said storage tank,
said reactants chamber further including a first outflow port with a valve at mid-height for delivering potable water from said reactants chamber, a second outflow port at the bottom of said reactants chamber, second outflow port having a valve, and at least two electrodes located in a lower portion of said reactants chamber, a voltage source and a controller arranged to supply a first electric voltage to said electrodes so as to create a first electric pulse between said electrodes while said water is in said reactants tank, said electric pulse having a relatively high voltage and short duration and creating an electric field between said electrodes that is intense and persistent enough to substantially destroy cyanotoxins, bacteria, viruses, and parasites in said chamber, said controller also arranged to apply a second electric voltage to said electrodes while said water is in said reactants tank after said first electric pulse is terminated, said second electric voltage being arranged to cause one of said two electrodes to be negatively polarized and the other of said two electrodes to be positively polarized, said second electric voltage having a relatively long-duration and a relatively low voltage, said low-voltage being sufficient to substantially sequester positively charged ions near said negatively charged electrode and negatively charged ions near said positively charged electrode, and a sand filter, said sand filter having an upper end arranged to receive said contaminated water from said storage tank, said sand filter further having a lower end including an outflow port for releasing said water into said reactants chamber after passage through said sand filter, whereby said contaminated water is stored in said storage tank, then said water is delivered into said reactants chamber where voltage from said source, controlled by said controller, is delivered to said electrodes for treating said water, then said treated water is delivered from said first outflow port of said reactants chamber while said remaining water in said reactants chamber is discarded through said second outflow port of said reactants chamber.

12. The apparatus of claim 11 wherein said first electric voltage is arranged to create a field between said electrodes of at least 20,000 volts/cm for one second.

13. The apparatus of claim 12, further including a sealed top on said sand filter and connected to said outflow port on said storage tank and a pump in said outflow port, whereby when said pump is energized, said contaminated water from said source is urged through said sand filter in order to increase the rate of filtration by said sand filter.

14. The apparatus of claim 12, further including a carbon filter arranged to receive water from said reactants chamber when said first valve in said first outflow port in said reactants chamber is opened, said carbon filter further including an outlet port and a valve at a lower end for removing radiation from said water.

15. The apparatus of claim 12, further including:
a sealed top on said sand filter and connected to said outflow port on said storage tank and a pump in said outflow port, whereby when said pump is energized, said contaminated water from said source is urged through said sand filter in order to increase the rate of filtration by said sand filter, and
a carbon filter arranged to receive water from said reactants chamber when said first valve in said first outflow port in said reactants chamber is opened, said carbon filter further including an outlet port and a valve at a lower end, whereby when said water contains radiation and said water passes through said carbon filter, said radiation is removed.

16. The apparatus of claim 11 wherein said first electric voltage is sufficient to create a direct-current electric field between said electrodes of at least 10,000 volts/cm for at least 0.1 second, and said relatively low voltage creates an electric field between said electrodes of at least 3 volts/cm for a duration of at least one minute.

17. The apparatus of claim 16 wherein said first electric voltage is sufficient to create a direct-current electric field between said electrodes of at least 20,000 volts/cm for at least one second, and said relatively low voltage creates an electric field between said electrodes of at least 12 volts/cm for a duration of at least ten minutes.

* * * * *